(12) United States Patent
Hanninen et al.

(10) Patent No.: US 12,066,616 B2
(45) Date of Patent: Aug. 20, 2024

(54) REFLECTIVE MICROSCOPE OBJECTIVE LENS FOR ALL COLORS

(71) Applicant: The Regents of the University of California, Oakland, CA (US)

(72) Inventors: Adam Hanninen, Costa Mesa, CA (US); Eric Potma, Irvine, CA (US); Rongguang Liang, Tucson, AZ (US)

(73) Assignees: The Regents of the University of California, Oakland, CA (US); Arizona Board of Regents on Behalf of the University of Arizona, Tucson, AZ (US)

( * ) Notice: Subject to any disclaimer, the term of this patent is extended or adjusted under 35 U.S.C. 154(b) by 365 days.

(21) Appl. No.: 17/164,109

(22) Filed: Feb. 1, 2021

(65) Prior Publication Data
US 2021/0255446 A1  Aug. 19, 2021

Related U.S. Application Data

(60) Provisional application No. 62/968,713, filed on Jan. 31, 2020.

(51) Int. Cl.
| G02B 21/04 | (2006.01) |
| G02B 17/08 | (2006.01) |
| G02B 21/33 | (2006.01) |

(52) U.S. Cl.
CPC ......... *G02B 21/04* (2013.01); *G02B 17/0832* (2013.01); *G02B 17/0844* (2013.01); *G02B 21/33* (2013.01)

(58) Field of Classification Search
CPC ............... G02B 21/04; G02B 17/0832; G02B 17/0844; G02B 21/33; G02B 26/0825; G02B 26/0841; G02B 27/0068; G02B 13/22; G02B 17/08; G02B 17/0828; G02B 17/0848; G02B 17/0856; G02B 21/02; G02B 21/241; G02B 26/0833; G01J 3/453; G01N 21/64; G01N 21/6402; G01N 21/6458; G01N 2021/1738; G01N 2021/558; G01N 21/255; G01N 21/35; G01N 21/65

See application file for complete search history.

(56) References Cited

U.S. PATENT DOCUMENTS

| 4,810,077 A * | 3/1989 | Sting ................... | G02B 21/084 |
| | | | 359/387 |
| 6,008,936 A * | 12/1999 | Simon ................. | G02B 21/082 |
| | | | 359/371 |
| 6,278,100 B1 * | 8/2001 | Friedman ............. | G02B 27/644 |
| | | | 359/399 |

(Continued)

*Primary Examiner* — Mustak Choudhury
(74) *Attorney, Agent, or Firm* — Brooks Kushman P.C.

(57) ABSTRACT

A reflective microscope objective lens includes a concave mirror system that reflects incoming radiation, a convex mirror in optical communication with the concave mirror system, and a primary concave mirror in optical communication with the convex mirror. The concave mirror system includes a first concave mirror. The primary concave mirror focuses outgoing radiation onto a focal plane wherein the concave mirror system. Characteristically, the convex mirror and the primary concave mirror are arranged to direct light along a non-concentric path.

20 Claims, 7 Drawing Sheets

(56) References Cited

U.S. PATENT DOCUMENTS

| | | | | |
|---|---|---|---|---|
| 2002/0012179 A1* | 1/2002 | Cao | ............... | G02B 27/148 |
| | | | | 359/857 |
| 2006/0227426 A1* | 10/2006 | Shirasaki | ........... | G02B 6/29392 |
| | | | | 359/577 |
| 2011/0007387 A1* | 1/2011 | Epple | ................ | G03F 7/70225 |
| | | | | 359/351 |

* cited by examiner

REFLECTIVE MICROSCOPE OBJECTIVE LENS FOR ALL COLORS

CROSS-REFERENCE TO RELATED APPLICATIONS

This application claims the benefit of U.S. provisional application Ser. No. 62/968,713 filed Jan. 31, 2020, the disclosure of which is hereby incorporated in its entirety by reference herein.

TECHNICAL FIELD

In at least one aspect, the present invention is related to broadband optical microscopy, multi-modal, reflective focusing, and objective lenses.

BACKGROUND

High-resolution microscopic imaging requires high numerical aperture objective lenses. Standard objectives are made of refractive materials such as glass and offer imaging performance near theoretical limits. Yet, such performance is only achieved in a relatively narrow range of the electromagnetic spectrum, as ultraviolet (UV) and infrared (IR) applications remain out of reach for glass-based objectives. Reflective objectives, on the other hand, support applications from the UV to the IR, enabling microscopic imaging free of chromatic aberrations.

Reflective objectives have been known for several hundred years. One particularly useful objective design used in reflecting microscopes is referred to as the Schwarzschild-Cassegrain (SC) objective which is a two-mirror configuration. It has a small convex first mirror concentrically positioned relative to a larger concave mirror. This design is relatively simple to implement and has defined the state-of-the-art for reflective focusing. Although this design works well, there are many disadvantages that limit its utility and inclusion in optical microscopes. These disadvantages include i) center obscuration reducing transmission; ii) poor contrast off-axis; iii) limited field-of-view; iv) interferences from the support "spider" arms of the first mirror; and v) a quasi-Bessel beam shape creating an elongated cigar-shaped focal volume. A few minor tweaks to the SC design have been implemented over the years including high NA objectives designed for multiple reflections between the first and second mirrors, aspherical and hyperbolic surfaces (Ritchey-Chretien design), catadioptric designs, axicon implementation, and concentric 3-mirror designs. However, these all utilize concentric optical designs. Embodiments of non-concentric designs are limited to UV photolithography used for Si wafer manufacturing. Because the light source for this application is UV or extreme-UV (EUV), wavelengths between 13.5-193 nm, these lenses are used in dedicated manufacturing machines and have not been translated to table-top microscopes.

The disadvantages of the most commonly used reflective objective in microscopy, the SC objective, have prevented its widespread use in microscopy. Accordingly, there is a need for improved microscope objectives that can economically be fabricated with improved performance.

SUMMARY

The present invention solves one or more problems of the prior art by providing in at least one aspect a light focusing microscope objective lens made entirely of reflective surfaces.

In another aspect, a non-concentric reflective objective that differs radically from the Schwarzschild-Cassegrain is provided. This approach to microscopic imaging allows, for the first time, high-resolution optical microscopy over the entire UV-IR range without the limitations posed by traditional designs. The novel microscope objective is bound to replace both refractive and reflective objectives in numerous microscope embodiments.

In still another aspect, a reflective microscope objective lens is provided. The reflective objective lens includes a concave mirror system that reflects incoming radiation, a convex mirror in optical communication with the concave mirror system, and a primary concave mirror in optical communication with the convex mirror. The concave mirror system includes a first concave mirror. The primary concave mirror focuses outgoing radiation onto a focal plane. Characteristically, the convex mirror, and the primary concave mirror are arranged to direct light along a non-concentric path.

In another refinement, a reflective microscope objective is provided. The reflective microscope objective includes a segmented mirror system that reflects incoming radiation, a convex mirror in optical communication with the second mirror system, and a primary concave mirror in optical communication with the convex mirror. Typically, the concave mirror system includes a first mirror in optical communication with the second mirror. The primary concave mirror focuses outgoing radiation onto a focal plane. Characteristically, the segmented mirror system, the convex mirror, and the primary concave mirror are arranged to direct light along a non-concentric path.

As set forth above, objective lenses are predominantly made from refractive lenses. The objective lens described herein offers advantages over existing technologies for many areas of research and development, in particular, for broadband and high peak-power ultrafast light sources. These systems are commonly operated in biomedical imaging labs and more recently clinics, manufacturing and product R&D departments, applications dedicated to spectroscopic chemical detection similar to FTIR, and the like. The objective lens is an intrinsic component of optical microscopes. Compared to standard refractive lenses, the reflective objective described below addresses the following points experienced in the optical microscopy field:

1. Low throughput. Whereas refractive objectives feature transmission efficiencies of 10%-60%, all-reflective surfaces represent minimum losses, directing much more light to the focus.
2. Low damage threshold. All reflective surfaces can withstand much higher laser powers compared to standard refractive solutions, which is important for several laser ablation and additive microscopic manufacturing applications.
3. Group delay dispersion (GGD). GDD limits the use of ultrashort pulses in microscopy. Unlike refractive lenses, reflective objectives have no GDD, allowing the use of ultrashort pulses without significant temporal broadening
4. Narrow wavelength regimes. With access from the UV to the MIR, the reflective objective accommodates microscopy applications that have remained out of reach for standard objectives.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein.

DETAILED DESCRIPTION

Reference will now be made in detail to presently preferred embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

When referring to a numerical quantity, in a refinement, the term "less than" includes a lower non-included limit that is 5 percent of the number indicated after "less than." A lower non-includes limit means that the numerical quantity being described is greater than the value indicated as a lower non-included limited. For example, "less than 20" includes a lower non-included limit of 1 in a refinement. Therefore, this refinement of "less than 20" includes a range between 1 and 20. In another refinement, the term "less than" includes a lower non-included limit that is, in increasing order of preference, 20 percent, 10 percent, 5 percent, 1 percent, or 0 percent of the number indicated after "less than."

The term "one or more" means "at least one" and the term "at least one" means "one or more." The terms "one or more" and "at least one" include "plurality" as a subset.

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

For any device described herein, linear dimensions and angles can be constructed with plus or minus 50 percent of the values indicated rounded to or truncated to two significant figures of the value provided in the examples. In a refinement, linear dimensions and angles can be constructed with plus or minus 30 percent of the values indicated rounded to or truncated to two significant figures of the value provided in the examples. In another refinement, linear dimensions and angles can be constructed with plus or minus 10 percent of the values indicated rounded to or truncated to two significant figures of the value provided in the examples.

Throughout this application, where publications are referenced, the disclosures of these publications in their entireties are hereby incorporated by reference into this application to more fully describe the state of the art to which this invention pertains.

The term "aspheric mirror" means a mirror having a reflective surface with a profile that is not a portion of a sphere or cylinder.

The term "optical communication" means that one mirror can receive radiation reflected by another mirror either directly or indirectly through one or more intermediate mirrors. Therefore, the term "direct optical communication" means that one mirror can directly receive radiation reflected by another mirror without an interposed optical element.

The term "radiation" means electromagnetic radiation, including optical radiation in the visible, infrared, ultraviolet, or other spectral regions.

The term "mirror system" means a configuration of one or more mirrors.

The term "concave mirror" refers to any mirror in which a collimated beam of light converges after reflection therefrom.

The term "convex mirror" refers to any mirror in which a collimated beam of light diverges after reflection therefrom.

The term "Strehl ratio" refers to the ratio of the peak intensity in the diffraction point spread function of the optical system to that of a perfect (i.e., aberration-free) diffraction-limited optical system.

The term "visible light" means electromagnetic radiation with wavelengths between 400 nm and 700 nm.

Abbreviations

"EUV" means extreme-UV.
"IR" means infrared.
"MFT" means modulated transfer function.
"MIR" means middle infrared (i.e., wavelengths between 3 microns to 10 microns).
"NIR" means near infrared (i.e., wavelengths between 700 nm and 10 microns).
"SC" means Schwarzschild-Cassegrain.
"UV" means ultraviolet.

With reference to FIGS. 1A, 1B, 1C, and 2, schematics for a reflective microscope objective are provided. Reflective microscope objective 10 includes concave mirror system 12 that reflects incoming radiation 14. The incoming radiation 14 is depicted in these figures as one or more lines corresponding to light rays. Concave mirror system 12 includes first concave mirror 16. In some variations, concave mirror system 12 includes a second concave mirror 18. Convex mirror 20 is in optical communication with the concave aspherical mirror system 12, and therefore, first concave mirror 16 and second concave mirror 18 if present. In one refinement, convex mirror 20 is in direct optical communication with first concave mirror 16. In another refinement, convex mirror 20 is in direct optical communication with second concave mirror 18. Primary concave mirror 22 is in optical communication with the convex mirror 20. Primary concave mirror 22 focuses outgoing radiation onto a plane 24 (i.e., a focal plane) through aperture 26. Characteristically, concave mirror system 12, convex mirror 20, and primary concave mirror 22 are arranged to direct light along a non-concentric path, i.e., a zigzag path about center axis a1 through microscope objective 10. Therefore, microscope objective 10 is referred to as "off-axis" and "non-concentric" with respect to this path of the radiation. In a refinement, concave mirror system 12, convex mirror 20, and primary concave mirror 22 are configured to provide a Strehl ratio greater than or equal to 0.8. In some refinements, concave mirror system 12, convex mirror 20, and primary concave mirror 22 are configured to provide a Strehl ratio greater than or equal to, in increasing order of preference, 0.8, 0.82, 0.84, 0.86, or 0.88. The Strehl ratio is a measure of optical image formation quality with a range from 0 to 1. Advantageously, microscope objective 10 can be used for microscopic focusing and imaging in the UV-visible-NIR-MIR range (i.e., wavelengths between 310 nm and 20 microns) of the electromagnetic spectrum.

Figure 1A:
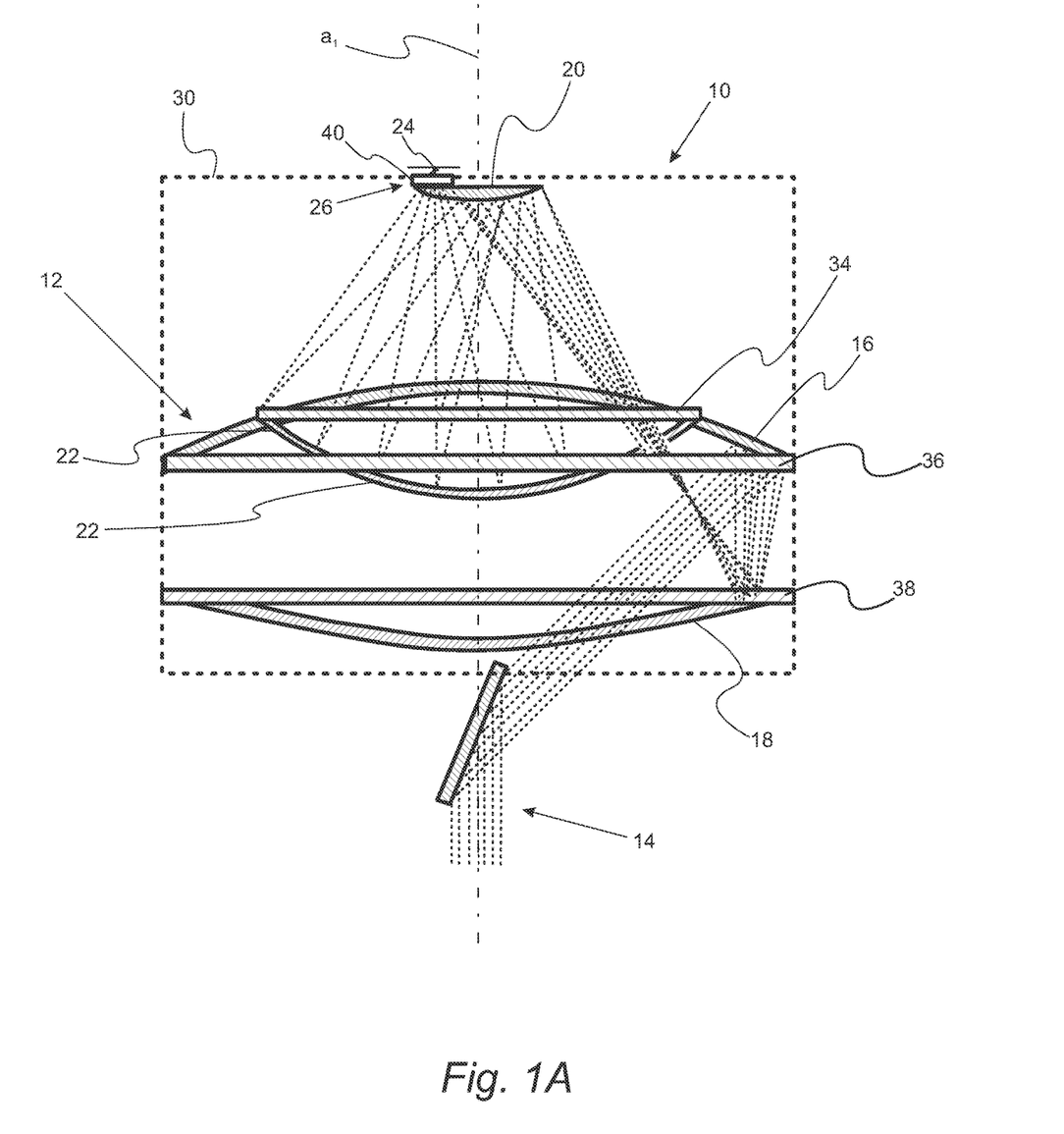
FIG. 1A provides a schematic view of a four-mirror microscope objective lens.
Figure 1B:
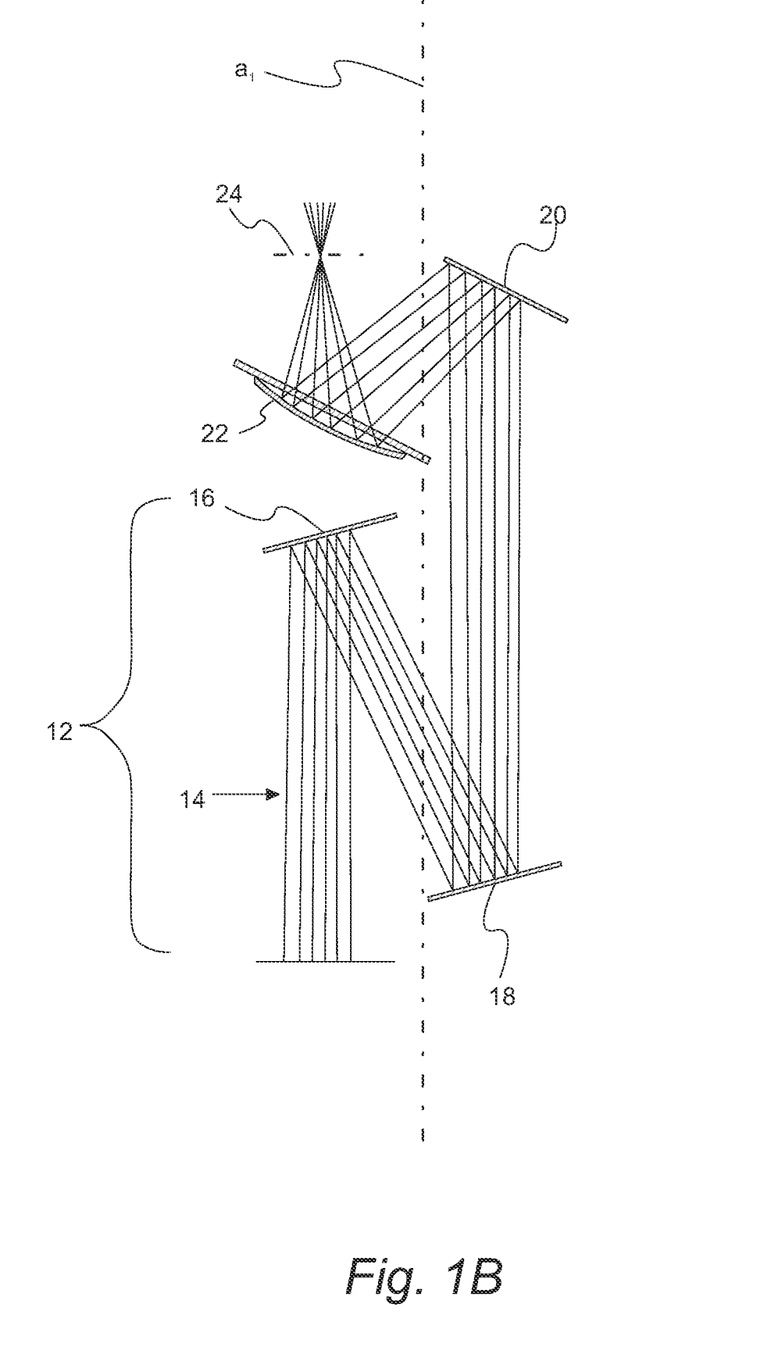
FIG. 1B provides a simplified schematic view of a four-mirror microscope objective lens.
Figure 1C:
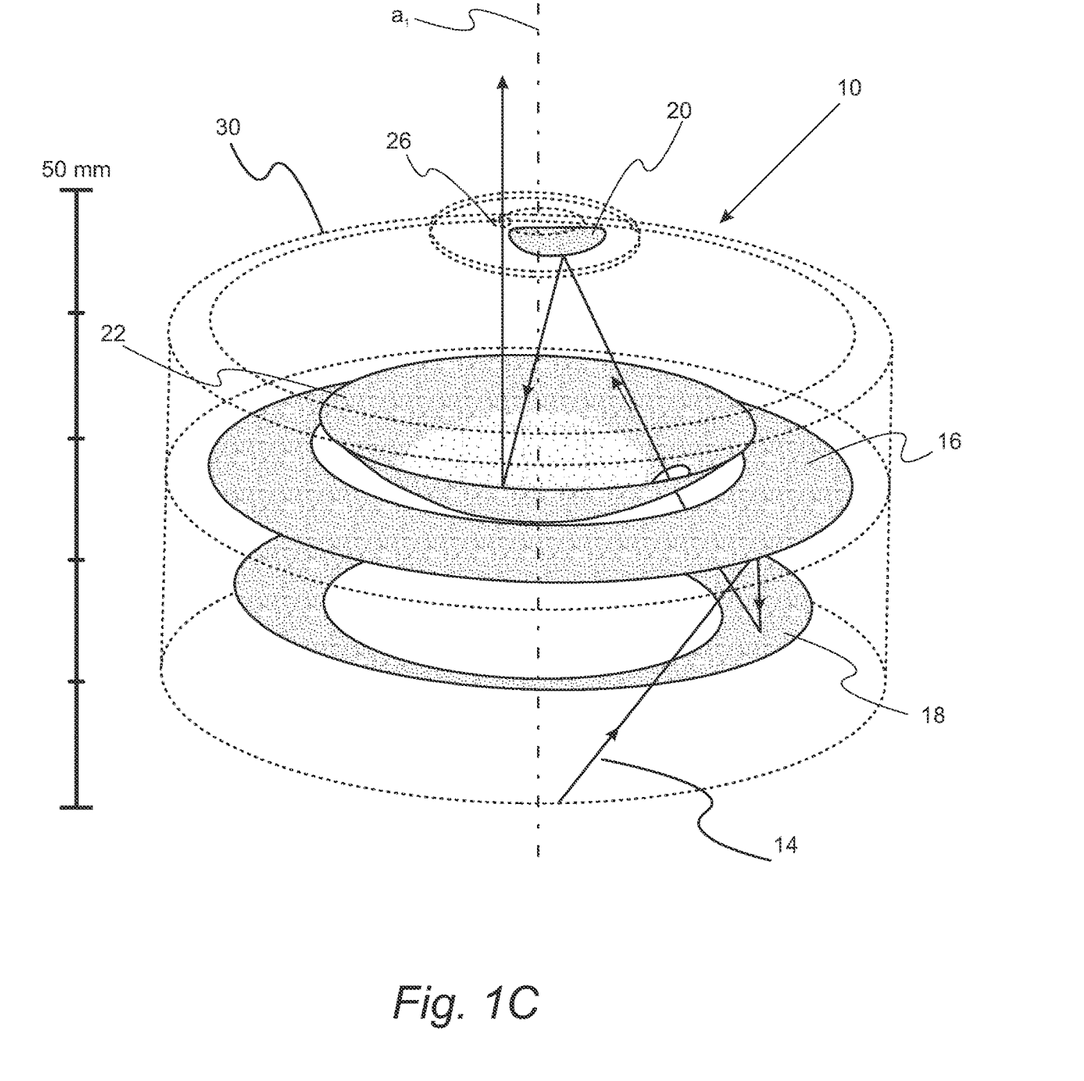
FIG. 1C provides a perspective view of the four-mirror microscope objective lens of FIG. 1A positioned in a housing.

It should also be appreciated that the image parameters such as numerical aperture, magnification, working distance, and field-of-view for microscope objective 10 can be adjusted while satisfying the requirement for easy integration in a standard upright or inverted microscope. Microscope objective 10 also includes housing 30 within which concave mirror system 12, convex mirror 20, and primary concave mirror 22 are disposed and held therein. Advantageously, each of the mirrors can be supported by aluminum mounts (e.g., mounts 34-38) with strong thermal heat-sinking, reflective components are natural solutions for applications that require high average and peak powers.

FIGS. 1A, 1B, and 1C are directed to a four-mirror reflective microscope objective. In this regard, FIG. 1A provides a schematic view of a four-mirror microscope objective lens. FIG. 1B provides a simplified schematic view of a four-mirror microscope objective lens. FIG. 1C provides a perspective view of the four-mirror microscope objective lens of FIG. 1A positioned in a housing. In the variation depicted in these figures, first concave mirror 16 reflects incoming radiation 14 (i.e., electromagnetic radiation) with second concave mirror 18 being in optical communication with first concave mirror 16. In a refinement, second concave mirror 18 is in direct optical communication with first concave mirror 16. Similarly, convex mirror 20 is in optical communication with second concave mirror 18. In one refinement, convex mirror 20 is in direct optical communication with second concave mirror 18. Primary concave mirror 22 is in optical communication with the convex mirror 20. In a refinement, primary concave mirror 22 is in direct optical communication with the convex mirror 20. Primary concave mirror 22 focuses outgoing radiation onto plane 24 (i.e., a focal plane). In another refinement, primary concave mirror 22 and first concave mirror 16 are interposed between convex mirror 20 and second concave mirror 18.

Figure 2A:
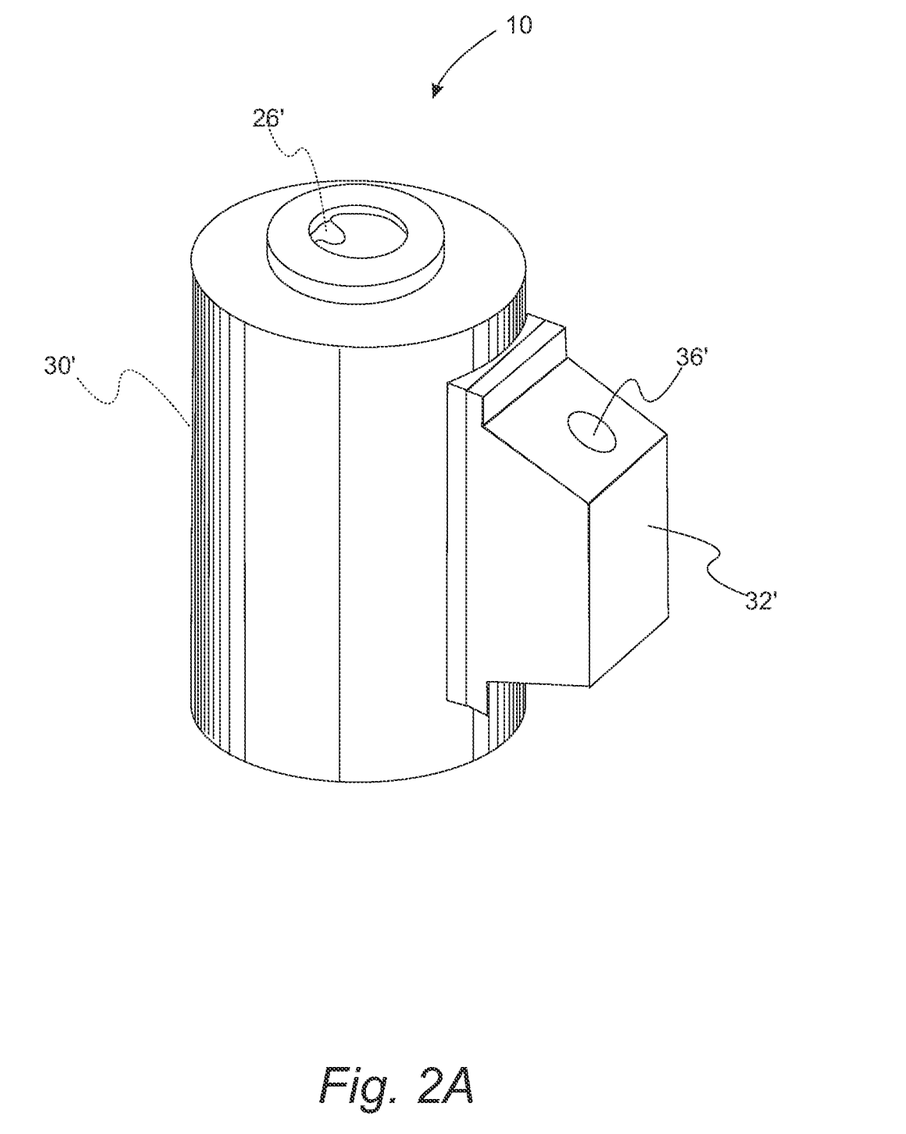
FIG. 2A provides a perspective view of a three-mirror microscope objective lens.
Figure 2B:
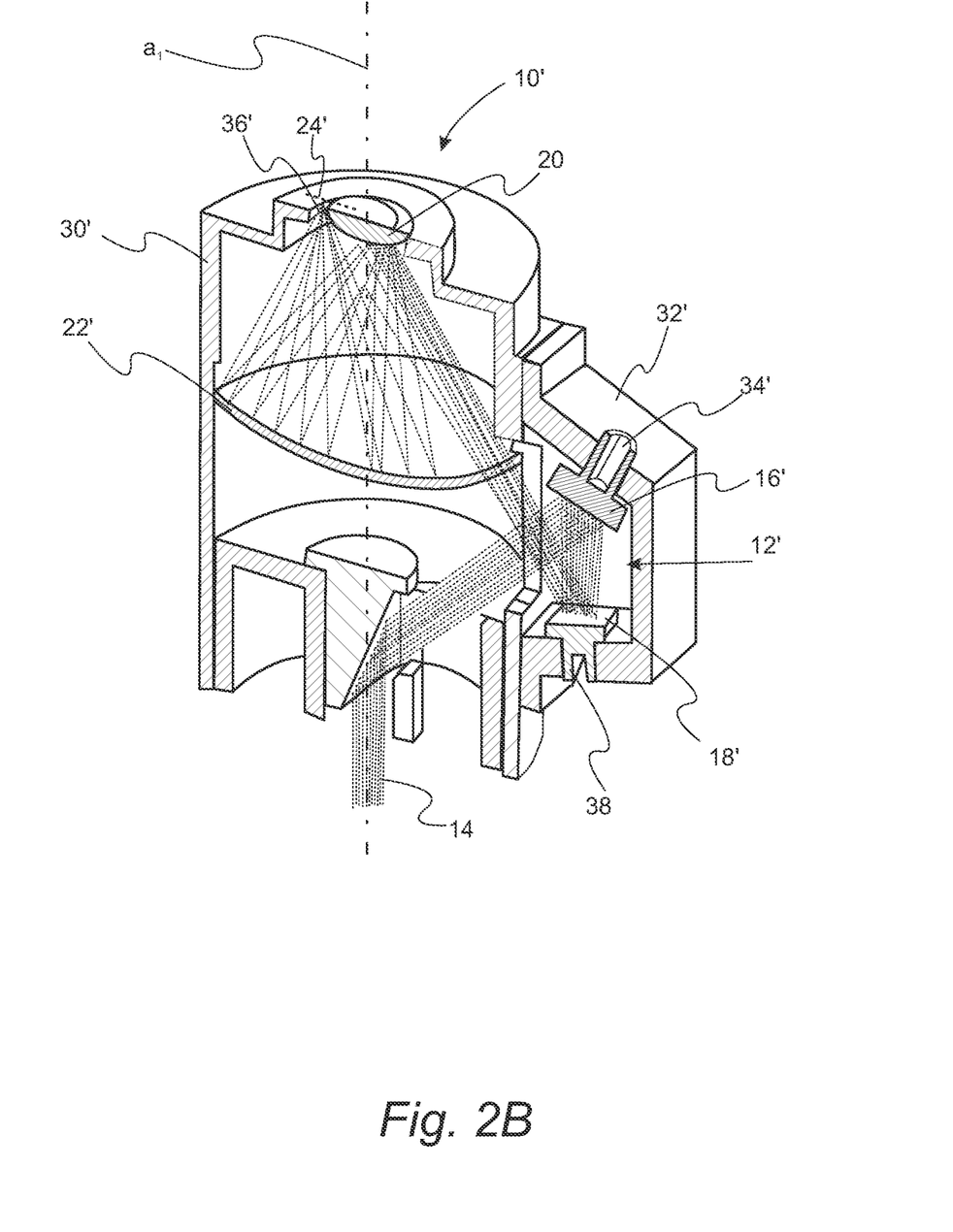
FIG. 2B provides a perspective view of a three-mirror microscope objective lens with a cut away showing the internal mirror system.

FIGS. 2A and 2B provide views of a schematics for a variation of a reflective microscope objective are provided. The reflective microscope objective of these figures is a variation of the microscope of FIGS. 1A, 1B, and 1C. There this objective is also directed to a four-mirror reflective microscope objective. Reflective microscope objective 10' includes segmented mirror system 12' that reflects incoming radiation 14'. The incoming radiation 14' is depicted in these figures as one or more dashed lines corresponding to light rays. Segmented mirror system 12' includes first mirror 16'. In some refinements, segmented mirror system 12' includes a second mirror 18'. Convex mirror 20' is in optical communication with the segmented mirror system 12', and therefore, first mirror 16' and second mirror 18' if present. It should be appreciated that first mirror 16' and second mirror 18' can be concave, flat, or convex. Advantageously, first mirror 16' and second mirror 18' can be mirror segments and not limited to whole rotational mirrors. This has the advantage of making the overall compound lens smaller and more compact. In one refinement, convex mirror 20' is in direct optical communication with first mirror 16'. In another refinement, convex mirror 20 is in direct optical communication with second mirror 18'. Primary concave mirror 22' is in optical communication with the convex mirror 20'. Primary concave mirror 22' focuses outgoing radiation onto a plane 24' (i.e., a focal plane) through aperture 26'. Characteristically, segmented mirror system 12', convex mirror 20, and primary concave mirror 22 are arranged to direct light along a non-concentric path, i.e., a zigzag path about center axis a1 through microscope objective 10'. Therefore, microscope objective 10' is referred to as "off-axis" and "non-concentric" with respect to this path of the radiation. In a refinement, segmented mirror system 12', convex mirror 20', and primary concave mirror 22' are configured to provide a Strehl ratio greater than or equal to 0.8. In some refinements, segmented mirror system 12', convex mirror 20', and primary concave mirror 22' are configured to provide a Strehl ratio greater than or equal to, in increasing order of preference, 0.8, 0.82, 0.84, 0.86, or 0.88. Advantageously, microscope objective 10 can be used for microscopic focusing and imaging in the UV-visible-NIR-MIR range (i.e., wavelengths between 310 nm and 20 microns) of the electromagnetic spectrum.

Still referring to FIGS. 2A and 2B, as set forth above, the image parameters such as numerical aperture, magnification, working distance, and field-of-view for microscope objective 10 can be adjusted while satisfying the requirement for easy integration in a standard upright or inverted microscope. Microscope objective 10' also includes primary housing 30' within which convex mirror 20', and primary concave mirror 22' are disposed and held therein. In a refinement, microscope objective 10' also includes secondary housing 32 in which segmented mirror system 12' is disposed. Secondary housing 32 is attached to primary housing 30'. Secondary having 32 and primary housing 30' define opening so that line can pass to and from the convex mirror 20' and primary concave mirror 22' in the primary housing 30' and segmented mirror system 12' in the secondary housing 32'.

Advantageously, each of the mirrors can be supported by aluminum mounts with strong thermal heat-sinking, reflective components are natural solutions for applications that require high average and peak powers. As depicted, first mirror 14' is held by mount 34' and second mirror 18' is held by mount 38'.

Still referring to FIGS. 2A and 2B, first mirror 16' reflects incoming radiation 14 (i.e., electromagnetic radiation) with second mirror 18' being in optical communication with first mirror 16'. First mirror 16' and second mirror 18' are each independently a concave mirror, convex, or a flat mirror. In a refinement, second mirror 18' is in direct optical communication with first mirror 16'. Similarly, convex mirror 20' is in optical communication with second mirror 18'. In one refinement, convex mirror 20' is in direct optical communication with second mirror 18'. Primary concave mirror 22' is in optical communication with the convex mirror 20'. In a refinement, primary concave mirror 22' is in direct optical communication with the convex mirror 20'. Primary concave mirror 22' focuses outgoing radiation onto plane 24' (i.e., a focal plane). In another refinement, primary concave mirror 22' and first mirror 16' are interposed between convex mirror 20' and second concave mirror 18'.

Figure 3:
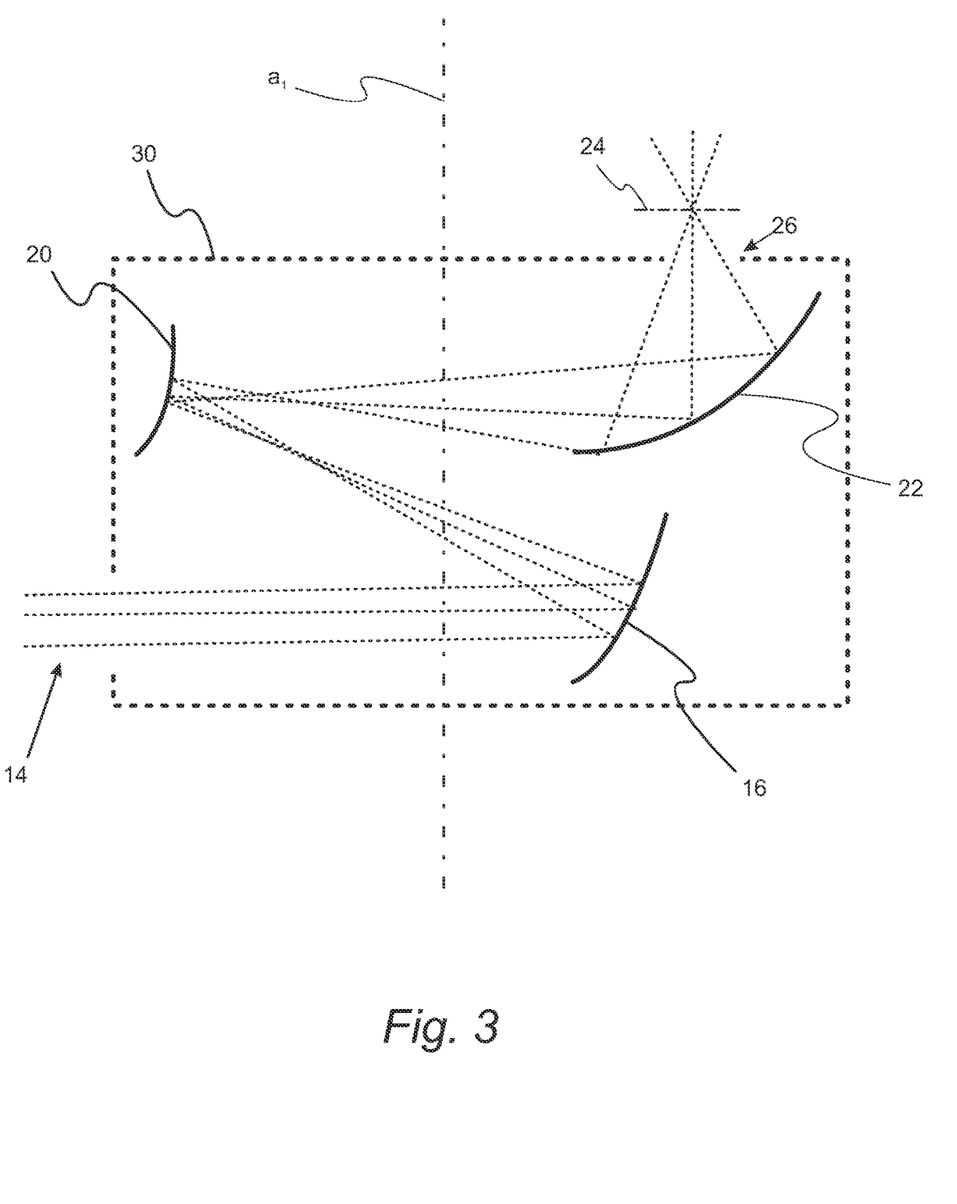
FIG. 3 provides a schematic view of a three-mirror microscope objective lens.

FIG. 3 is directed to a variation in which the objective is a three-mirror reflective microscope objective. In this regard, FIG. 2 provides a schematic view of a three-mirror microscope objective lens. In the variation depicted in these figures, first concave mirror 16 reflects incoming radiation 14. Convex mirror 20 is in optical communication with first concave mirror 16. In one refinement, convex mirror 20 is in direct optical communication with first concave mirror 16. Primary concave mirror 22 is in optical communication with the convex mirror 20. In a refinement, concave primary mirror 22 is in direct optical communication with the convex mirror 20. Primary concave mirror 22 focuses outgoing radiation onto plane 24 (i.e., a focal plane). In the example depicted, the first concave mirror, the convex mirror, and primary mirror are configured such that an object-plane and an image-plane are not coaxial.

It should be appreciated that each mirror of the concave mirror system, the convex mirror, and the primary concave mirror can independently be a spherical mirror, an aspherical mirror, or a free form mirror. Although the present invention is not limited by the materials used to construct the reflecting surfaces, metallic surfaces such as aluminum, gold, and silver, as well as dielectric thin-film layered surfaces are particularly useful. In a refinement, each mirror of the concave mirror system 12, the convex mirror 20, and the primary concave mirror 22 are independently an aspherical mirror. In a refinement, the first concave mirror, the second concave mirror if present, the convex mirror, and the primary concave mirror are each independently symmetric about an axis. In this regard, each of the mirrors includes even-functioned aspherical terms to achieve nearly diffraction-limited performance over the interior of a pre-determined field of view (e.g., 300×300 microns). The emphasis here is to design excellent performance using rotationally symmetric surfaces (i.e., even terms). Not only is this advantageous for manufacturing using diamond turning machines, but also for metrology used in quality control.

In one variation, the reflective microscope objective is designed for a "dry" or "air" objective lens as it does not use an immersion liquid. In another variation, microscope objective 10 includes final optic 40 (e.g. fused silica or calcium-fluoride $CaF_2$) which allows the objective to be used in an immersion fluid (e.g., water, oil, etc.). Such a design is referred to as a "catadioptric design" as it uses both reflective and refractive components. In a refinement, final optic 40 (e.g., optical component) is position at aperture 26. This positioning also act to seal aperture 26 so that liquid does not enter internal spaces of reflective objective 10. Final Optic 40 can be flat (i.e., planar on both sides), or it may have optical power (i.e., it is curved and aids in the focusing of the light). This latter variation is useful in that the numerical aperture (NA) defines resolution, and scales with the index of refraction of the immersion liquid. Moreover, refractive elements may be included before or in between the non-concentric reflective surfaces.

Advantageously, reflect microscope object 10 set forth above can be incorporated into various optical systems. In one variation, an optical imaging system includes reflective microscope objective 10. In another variation, an optical microscope includes reflective microscope objective 10. Such optical microscopes can provide broadband microscopy. In a refinement, such optical microscopes provide nonlinear optical microscopy. In another variation, a spectroscopic system includes reflective microscope objective 10. In still another variation, includes reflective microscope objective 10 used in high power application. Therefore, reflective microscope objective 10 can be incorporated into an additive and subtractive laser-assisted manufacturing system.

The following examples illustrate the various embodiments of the present invention. Those skilled in the art will recognize many variations that are within the spirit of the present invention and scope of the claims.

An example of the objective lens of FIGS. 1A, 1B, and 1C is optimized for implementation for optical microscopy. The main advantages of this design over the Schwarzschild-Cassegrain objective is a) improved transmission due to elimination of center obscuration, b) reduced side lobes of the lateral point spread function, c) more confined axial point spread function, d) near-diffraction limited off-axis performance, and e) improved field of view (FOV). Some of the specifications of a 0.7 NA design are compared with a commercial Schwarzschild-Cassegrain lens in Table 1.

TABLE 1

Parameter comparison between a Schwarzschild-Cassegrain lens and an example of the reflective objective of FIGS. 1A, 1B, and 1C.

| Parameter | Schwarzschild design | Reflective objective example |
| --- | --- | --- |
| Numerical aperture | 0.65 | 0.7 |
| Diameter FOV [μm] | 100 | 300 |
| Transmission (0.45-20 μm) | 70% | >90% |
| Working distance [mm] | 0.8 mm | 1.0 mm |
| Resolution at 1030 nm (lateral, axial) [μm] | 0.7, 1.4 | 0.6, 1.0 |

Figure 4A:
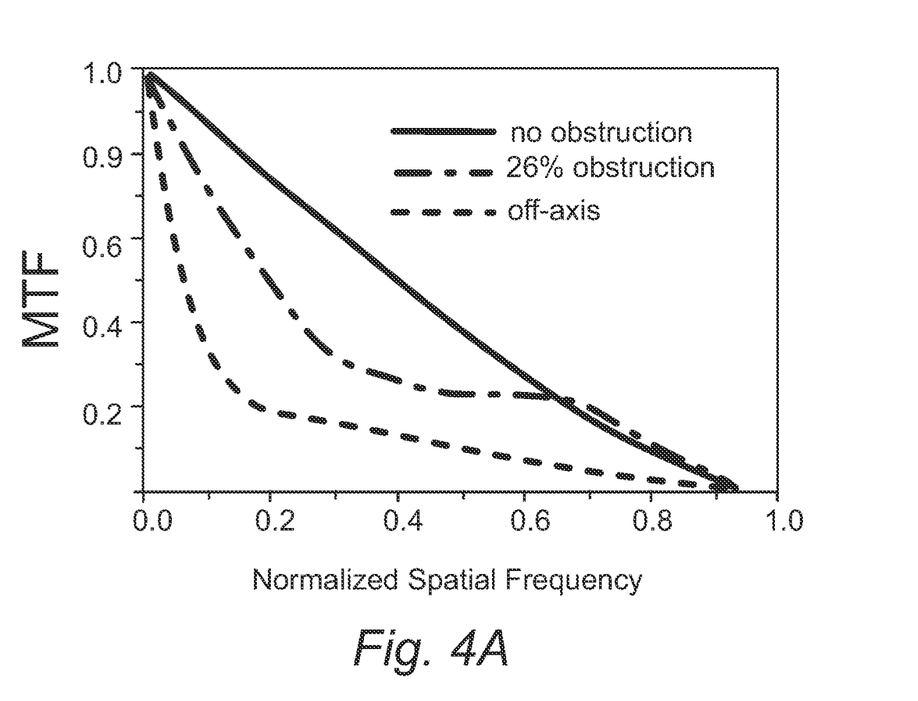
FIG. 4A provides plots of the theoretical on-axis modulated transfer function (MTF) of a SC objective lens without a center obscuration compared to the MTF of an objective with a 26% center obscuration. Contrast at lower spatial frequencies is significantly reduced, and performance off-axis with the obscuration (0.15 mm off-axis) is further reduced.

A good measure for the imaging performance can be obtained from the modulation transfer function (MTF). The Schwarzschild design and all obscuring designs for that matter have reduced transmission because the first mirror blocks on-axis light, which also results in a reduced MTF at lower frequencies. FIG. 4A depicts the MTF for an ideal lens compared to the on-axis performance and off-axis performance from a Schwarzschild objective lens offered by a major retailer.

Figure 4B:
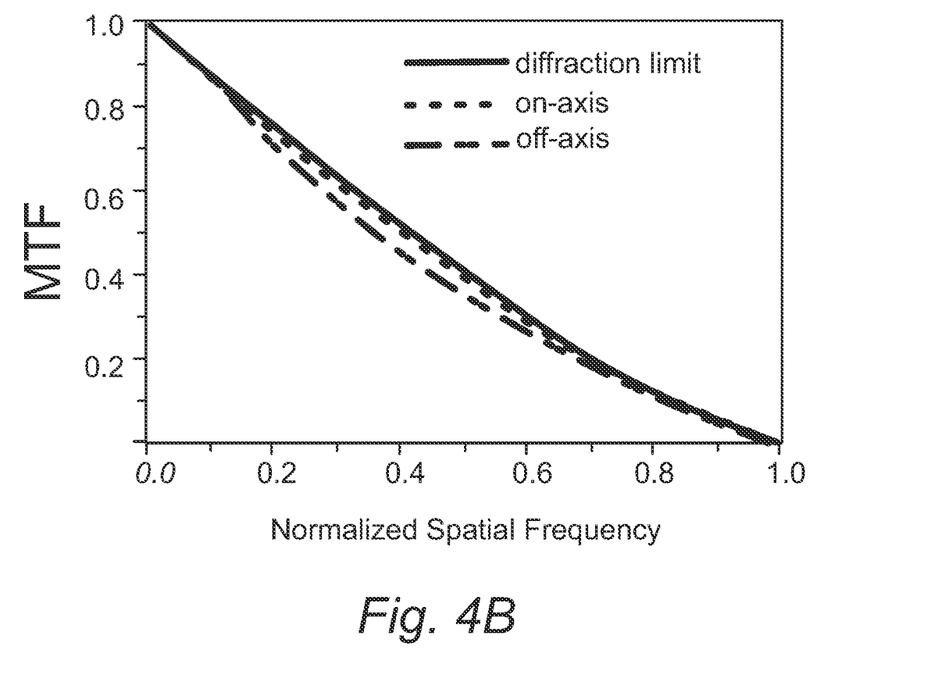
FIG. 4B provides plots of the MTF for an example of the objective design of FIG. 1A for on-axis focusing and off-axis focusing (0.15 mm off-axis) as compared to the theoretical diffraction limit.

Besides a drop-in contrast at low spatial frequencies, the Schwarzschild design also suffers from reduced axial resolution. Due to the obscuring nature of the reflective objective, the excitation field takes on a quasi-Bessel beam shape, resulting in a focal volume that is elongated, stretched in the z-axis by a factor of about 30%. FIG. 4B shows the MTF for the current design of the proposed lens, both on-axis and off-axis. As can be gleaned from the figure, the performance is very near the diffraction limit, indicative of a well-engineered optic. At the edge of the designed FOV, 0.15 mm off-axis, the MTF still reveals superb focusing capabilities.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A reflective microscope objective comprising:
a concave mirror system that reflects incoming radiation, the concave mirror system including a first concave mirror;
a convex mirror in optical communication with the concave mirror system, the convex mirror reflecting the reflected radiation from the concave mirror system; and
a primary concave mirror in optical communication with the convex mirror, the primary concave mirror reflecting the reflected radiation from the convex mirror and focusing outgoing radiation onto a focal plane wherein the concave mirror system, the convex mirror, and the primary concave mirror are arranged to direct light along a non-concentric path, wherein the first concave mirror, the convex mirror, and the primary concave mirror are each independently symmetric about an axis, the primary concave mirror defining an off-axis opening for passing the incoming radiation therethrough.

2. The reflective microscope objective of claim 1 wherein each mirror of the concave mirror system, the convex mirror, and the primary concave mirror are each independently a spherical mirror, an aspherical mirror, or a free form mirror.

3. The reflective microscope objective of claim 1 wherein each mirror of the concave mirror system, the convex mirror, and the primary concave mirror are each independently an aspherical mirror.

4. The reflective microscope objective of claim 1 wherein the convex mirror is in direct optical communication with the first concave mirror.

5. The reflective microscope objective of claim 1 wherein the concave mirror system includes a second concave mirror in optical communication with the first concave mirror.

6. The reflective microscope objective of claim 1 wherein the primary concave mirror is in direct optical communication with the convex mirror.

7. The reflective microscope objective of claim 1 further comprising a housing within which the concave mirror system, the convex mirror, and the primary concave mirror are supported.

8. The reflective microscope objective of claim 1 wherein the first concave mirror, the convex mirror, and the primary concave mirror each independently symmetric about an axis.

9. The reflective microscope objective of claim 1 wherein the concave mirror system, the convex mirror, and the primary concave mirror are configured to provide a Strehl ratio greater than or equal to 0.8.

10. The reflective microscope objective of claim 1 wherein outgoing radiation passes through an aperture when focused on the focal plane.

11. The reflective microscope objective of claim 1 further comprising a final optic that allows the reflective microscope objective to be used in an immersion fluid.

12. The reflective microscope objective of claim 11 wherein the final optic is flat or has an optical power.

13. An optical imaging system comprising the reflective microscope objective of claim 1.

14. An optical microscope comprising the reflective microscope objective of claim 1.

15. The optical microscope of claim 14 providing broadband microscopy.

16. The optical microscope of claim 14 providing nonlinear optical microscopy.

17. A spectroscopic system comprising the reflective microscope objective of claim 1.

18. An additive and subtractive laser-assisted manufacturing system comprising the reflective microscope objective of claim 1.

19. The reflective microscope objective of claim 1, wherein the non-concentric path is a zigzag path.

20. A reflective microscope objective comprising: a segmented mirror system that reflects incoming radiation, including a first mirror in optical communication with a second mirror, the first mirror and the second mirror being mirror segments;
a convex mirror in optical communication with the segmented mirror system; a primary concave mirror in optical communication with the convex mirror, the primary concave mirror focusing outgoing radiation onto a focal plane wherein the segmented mirror system, the convex mirror, and the primary concave mirror are arranged to direct light along a non-concentric path;
a primary housing within which the convex mirror and the primary concave mirror are disposed and held therein; and a secondary housing in which the segmented mirror system is disposed, wherein the secondary housing is attached to the primary housing.

\* \* \* \* \*